Aug. 4, 1942.  A. D. OWEN  2,292,286
METHOD OF TREADING TIRE CASINGS
Filed Oct. 8, 1941  2 Sheets-Sheet 1
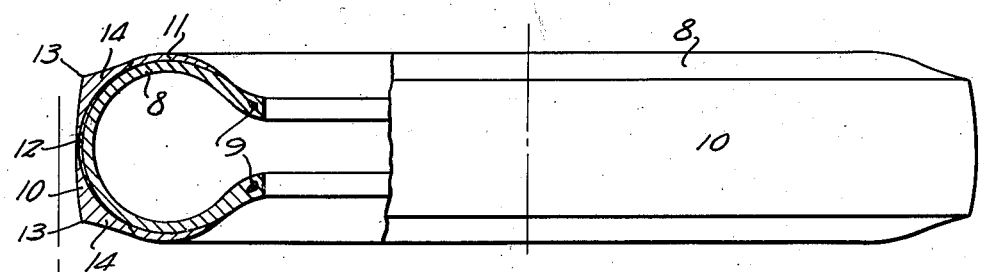
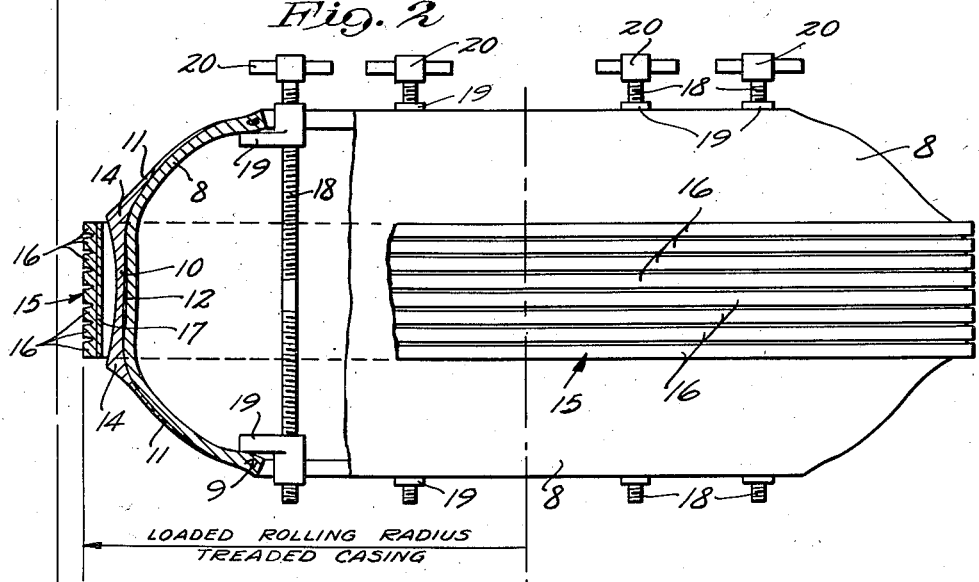
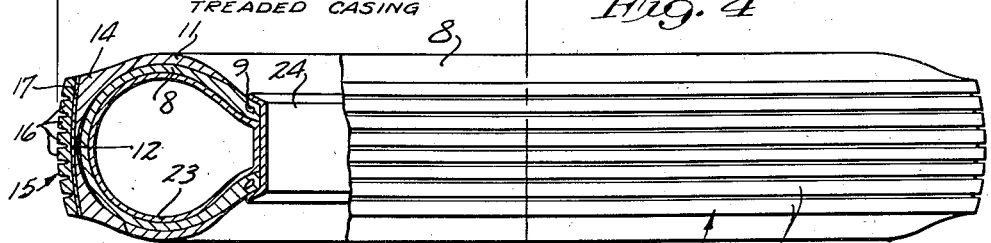
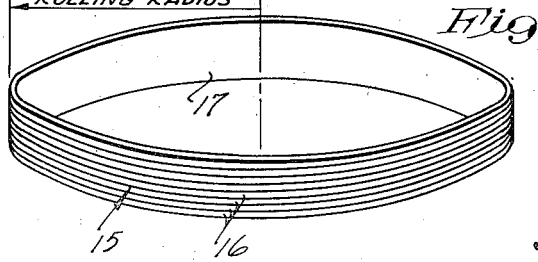
Inventor
Allison Donham Owen
By his Attorneys Aug. 4, 1942. A. D. OWEN 2,292,286
METHOD OF TREADING TIRE CASINGS
Filed Oct. 8, 1941 2 Sheets-Sheet 2
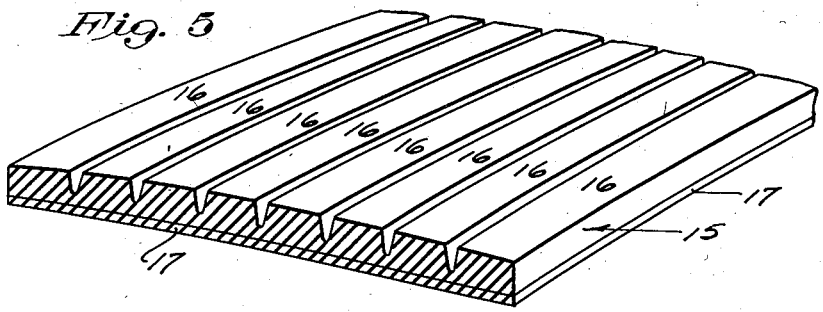
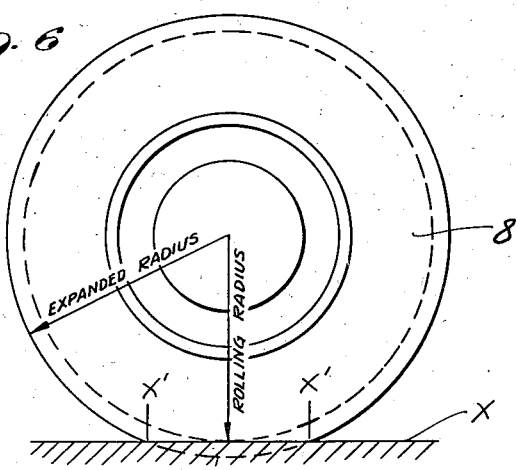
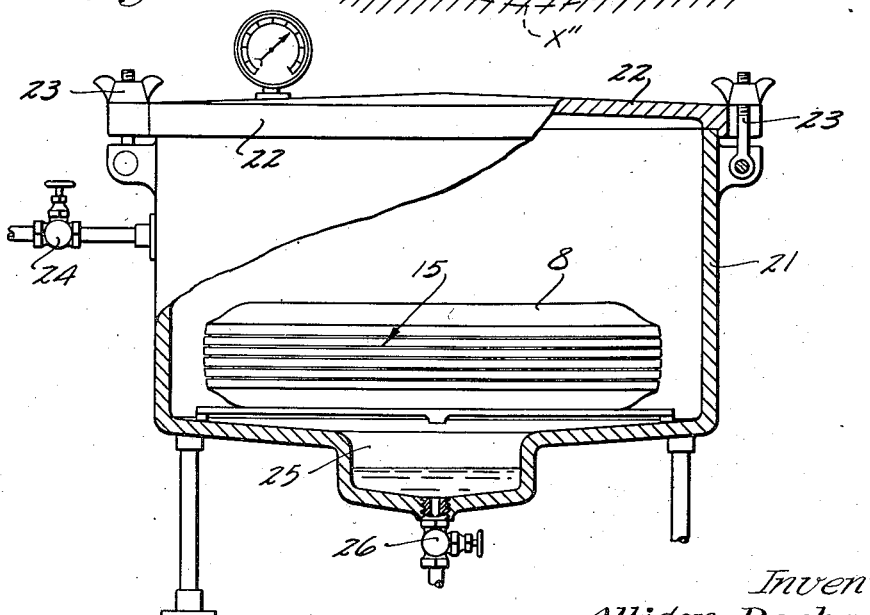
Inventor
Allison Donham Owen
By his Attorneys Patented Aug. 4, 1942

2,292,286

UNITED STATES PATENT OFFICE 2,292,286

METHOD OF TREADING TIRE CASINGS

Allison Donham Owen, San Francisco, Calif., assignor to Paul E. Hawkinson Company, Minneapolis, Minn., a corporation of Minnesota Application October 8, 1941, Serial No. 414,153

10 Claims. (Cl. 18—59)

My present invention relates to an improved method of adding and permanently securing to the crown portion of a tire casing a new annular band of road engaging tread material, for the purpose of replacing tread material which has been worn off in service, or otherwise removed, or for the purpose of completing a new tire that has been built up and cured out with only an incomplete tread. Generally stated, the invention hereof consists of novel method steps and combinations of steps hereinafter fully described in connection with the appended drawings.

In accordance with my present invention, a precured and preferably preformed endless annular band of tread material is placed on and adhered to the peripheral crown portion of a tire casing. I recognize the fact that the broad idea of applying precured and preformed tread material over the peripheral crown portion of a tire casing is not new with me but is, in fact, very old in the tire retreading art, but what I do believe is new with me is the forming and curing up of an endless annular band of tread material to the peripheral crown portion of a tire casing, since, insofar as I am aware, all previous attempts to utilize precured and preformed tread material for treading tires has involved the use of strip tread stock which was wrapped around the tire casing and thereafter joined at its ends.

As a further important feature of the invention, I preferably form such an endless annular tread band of rubber or other material which will be elastic when cured, and subsequently apply this to the peripheral crown portion of a tire casing having a greater circumference and radius than the internal circumference and radius of the endless annular tread band, so that the tread band will be stretched and maintained under tension to contract when the treaded casing is later placed in service.

Preferably the endless annular tread band selected for any particular tire casing will be one that has been cured to and, therefore, has a normal radius that is materially less than the normal "expanded radius" of the ultimately treaded casing and which radius, closely approximates the expected "loaded rolling radius" of the tire casing; the "loaded rolling radius" being the radius of the treaded casing at the center point of flat road contact under normal load. Treads cured circumferentially short to a radius less than the normal expanded radius thereof and to the approximate "loaded rolling radius" have been commercially produced on a large scale and with great success for several years by the well known "Hawkinson system" of tire treading, as practiced under the Hawkinson Patents Nos. 1,917,261 and 1,917,262 and have become famous for their long wearing and easy rolling characteristics, but I believe that I am the first to provide a method whereby a "precured tread" can be applied to a tire casing in such a manner that it will be stretched and maintained under tension when the tire is inflated to its "expanded circumference" and will be maintained under tension to contract circumferentially to a reduced radius which may, and preferably does, approximate the "loaded rolling radius" of the tire casing when ultimately placed in service.

In carrying out the invention the peripheral crown portion of the casing is preferably contracted to a reduced circumference and radius less than the internal circumference and radius of the short cured endless annular tread band to permit easy application of the short cured tread band and then, for the adhesion or bonding step, the casing is usually equipped with a suitable rim and inner tube and inflated to its normal cross-sectional shape, circumference and radius against the action of the short cured tread band, so that the casing will be subject to the elastic contracting force of the tread band during the adhesion step.

Also in carrying out the invention in the preferred manner, a thin annular layer of adhesion material, requiring curing, (usually uncured or partially cured rubber) is interposed between the precured tread band and the peripheral crown portion of the previously cured tire casing and permanent bonding between the new tread and casing is accomplished by application of heat to cure the adhesion or bonding material. The best commercial practice seems to be for the manufacturer of the precured tread bands, to furnish these to the user with a thin layer of uncured adhesion material applied to the inner surface thereof. Of course, the pressure exerted by the stretched tread band against the adhesion layer during the curing operation is deemed an important factor in obtaining a secure and permanent bond.

The above and other highly important objects and features of the present invention will be made apparent from the following specification, claims and appended drawings.

Referring to the drawings:

Fig. 1 is a plan view, with some parts broken away and some parts shown in transverse cross-section, of a pneumatic tire casing that has been worn down to the point where retreading becomes desirable;

Fig. 2 shows the tire casing of Fig. 1 in a laterally spread circumferentially and radially contracted condition during the step or operation of applying a precured and formed annular band of new road engaging tread material;

Fig. 3 is a perspective view on a reduced scale of the precured annular band of new road engaging tread material of Figs. 2, 4 and 5.

Fig. 4 is a view similar to Fig. 1 but showing the tire casing subsequent to the tread applying operation or step of Fig. 2 and inflated to the cross-sectional condition it will assume during the adhesion step or operation and when subsequently placed in service;

Fig. 5 is a fragmentary perspective view of the precured tread band and its applied adhesion strip;

Fig. 6 is a diagrammatic view illustrating a pneumatic tire as it appears under load on a flat road and is for the purpose of illustrating the normal "expanded radius" of the tire casing and the "loaded rolling radius" of the tire casing; and Fig. 7 is a view showing the treaded tire casing of Fig. 4 placed in a steam kettle for the adhesion or curing step.

The pneumatic tire casing illustrated in the drawings is of the conventional character employed in automobile and truck service and is made up of elements including the usual cord carcass 8 which has reinforced rim engaging beads 9. Applied over the exterior of the carcass 8 is the usual rubber covering consisting of a road engaging crown tread 10 and side wall protecting portions 11. Interposed between the crown of the carcass 8 and the crown tread material 10 of the original tire casing is the usual breaker strip 12. The cord carcass 8, which is of the usual structure, and, hence, may be assumed to be made up of superimposed layers of diagonally disposed cords held together by a resilient rubber binder, is normally round cross-sectionally, as shown in Figs. 1 and 4. The road engaging crown surface of the original tread material 10, and which crown surface is indicated by 12 and extends laterally between edges 13, is cross-sectionally arcuate but has a much greater radius than has the tire casing and, hence, is relatively very flat cross-sectionally as compared to the cross-sectionally round tire carcass. Because the crown surface 12 of the original tread material is relatively flat cross-sectionally as compared to the cross-sectionally round carcass underlying it, the tread material 10 essentially has relatively very thick shoulder portions 14 at its laterally spaced edges.

Method

The first step in the improved method consists in forming and curing up an endless, annular band of elastic road-engaging tread material for subsequent application to a tire casing of a certain predetermined size. Such a precured endless, elastic tread band is indicated as an entirety by 15 in the drawings and this tread band 15, which may be assumed to be of tread rubber stock commonly used for tire treading, is preferably formed and cured up to provide a desired tread design in its outer surface. Of course, many different tread designs may be molded directly in the tread, but the tread band 15 is shown as being provided with a laterally spaced series of annular design-forming ribs 16. This step in the method or process will usually be carried out by a manufacturer who will supply the precured, endless, annular tread bands to the tire treading trade in various different sizes for application to predetermined different sizes of tires. In other words, each size of tread band will be of a width proper for a certain definite tire size and will have a radius at all points about its circumference that is materially less than the expected expanded circumference of a newly treaded tire casing of that particular size and which radius will preferably closely approximate the "loaded rolling radius" of a newly treaded casing of that particular size. For example, if a tire casing of 6.00—16 size (six inch cross-sectionl diameter and a rim size of sixteen inches) has a normal expanded radius of fifteen inches and should have a "rolling radius" of 14¼" when subject to normal inflation and normal load, then a precured, endless, annular tread band intended for that size tire would be cured to an outside radius materially less than 15" and preferably to a radius closely approximating the expected "loaded rolling radius" of 14¼".

The next step in carrying out the improved method or process in the preferred order consists in applying to the inside annular surface of the endless, annular tread band 15 a thin annular layer of adhesion material 17, which, adhesion material, is preferably and may be assumed to be of uncured rubber or at least only partially cured rubber, but, of course, may be of any suitable material which, when subsequently cured, will have the desired elasticity and tensile strength to produce a good bond between the new tread material and the old crown tread material of the casing to which it is applied. In practice this phase of the method is preferably carried out directly by the producer or manufacturer of the precured endless annular layer of tread material who will apply the adhesion layer directly thereto after the tread band has been cured and before it is shipped to the treading trade. However, it should be understood that this adhesion layer 17 can be applied to the precured tread stock by the treader or may, in fact, be applied directly to the crown of the casing to be treaded.

The next step in the improved method is carried out directly on the selected tire casing and consists in preparing the crown surface of the original tread material 10 thereof, between edges 13—13, for reception of the new tread band, and this can best be done by buffing the crown surface 12 to remove any possible high spots or irregularities and at the same time clean the surface and roughen the same sufficiently to provide a good bonding surface. This step in the method is in accordance with the teaching of the prior art Hawkinson Patents Nos. 1,917,261 and 1,917,262.

The next step in the method consists in applying to the now prepared crown surface 12 of the original tread material 10 a precured and preferably preformed endless, annular band of elastic road-engaging tread material which, annular tread band, has a radius at all points about its circumference materially less than the expected radius thereof subsequent to application to the tire casing and after the carcass of the casing has been inflated to its normally round cross-sectional shape. Assuming that the treader has a stock of precured endless, annular tread bands 15, he will simply select from such stock a tread band of the proper size and, of course, the inside radius of such a tread band will be materially less than the radius of the peripheral crown surface 12 of the original tire tread material to which it is to be applied. Of course, this means that application of the precured tread band to the crown of the tire casing requires either contracting of the crown of the tire carcass to a radius and circumference less than the radius and circumference of the inside of the endless, annular tread band or that the endless, annular tread band be stretched so that the circumference and radius of its inner surface is greater than that of the crown of the casing to which it is to be applied. While either of these schemes are acceptable so long as the tread is applied with equal tension at all points about the crown of the casing, contraction of the crown of the casing has been found to be the most practical and can readily be accomplished by evenly spreading the beads 9 of the tire casing, as shown best in Fig. 2, until the crown surface 12 of the original tread material is circumferentially and radially contracted to a point where the radius thereof at all points about its circumference is less than the inside radius of the precured annular tread band 15 and its adhesion layer 17. With the crown of the carcass thus circumferentially and diametrically contracted, the tread band, with its adhesion layer, can readily be centered over the prepared crown surface 12 of the tire casing, as shown in Fig. 2, after which the beads 9 of the tire casing may be relieved of spreading action so that the casing will be permitted to exert its natural elastic expansive energy against the newly applied tread band through the medium of the interposed layer of adhesion material 17. This radial and circumferential contraction of the crown portion of the casing, from the normal radius thereof shown in Fig. 1 to the contracted radius condition thereof shown in Fig. 2, is best brought about through the use of bead spreading devices such as shown in Fig. 2. The spreading devices of Fig. 2 are applied in circumferentially spaced relation about the casing beads 9 and are operated to spread the beads equally about their circumferences and thereby maintain the beads in substantially parallel relation so that the contraction of the crown of the casing will be even about the entire circumference thereof. Of course, it will be appreciated that any suitable means for spreading the beads may be employed. The particular spreading devices illustrated, however, each comprise a screw-threaded shank or spindle 18 provided with left and right-hand screwthreads equipped with nut-acting rim-engaging lugs 19 and a rigidly secured hand-piece 20.

After the precured tread band, with its applied adhesion tread 17, has been centered over the contracted crown of the casing, as shown in Fig. 2, the crown portion of the casing is permitted to expand into engagement with the adhesion band 17 by relieving the beads 9 from lateral spreading action. When the beads are entirely free from spreading action, the carcass will tend to return to the cross-sectionally round condition in which it was originally cured (see Fig. 1) and will exert its full elastic expansive energy against the radially and circumferentially undersized precured tread band 15, thereby tending to stretch this short tread band and place the tread band under tension. The restraining force of the elastic undersize tread band will, however, usually prevent the casing from fully resuming its cross-sectionally round shape under the expansive energy of the casing alone.

The next step in the improved method hereof is the curing of the annular adhesion band 17 so as to provide a strong and permanent bond between the already cured tread band 15 and the already cured casing material, and to this end, the adhesion layer 17, being of uncured or only partially cured rubber, or similar substance, must be subject to vulcanizing heat and preferably a combination of heat and pressure. Preparatory to the heating process, I preferably equip the tire casing with a suitable inner-tube 23 and a suitable steel rim 24, and then inflate the casing so that the carcass thereof assumes its normally round cross-sectional shape and in which condition the tread band 15 is stretched and maintained under tension and is expanded to its "expanded radius," all as shown in Fig. 4. While the heat curing of the adhesion or bonding strip 15 may be accomplished in various different ways, I preferably carry out this step or phase of the method by placing the newly treaded and inflated casing, as shown in Fig. 4, in a steam kettle such as is indicated as an entirety by 21 in Fig. 7. When the casing is placed in the kettle, as shown in Fig. 7, the entire exposed exterior of the treaded and inflated casing will be subject to heated fluid under pressure for a length of time necessary to thoroughly cure the adhesion or bonding strip 17.

The steam kettle 21 is of the conventional character and is provided with a removable cover 22 that is secured in position for the curing operation by clamping devices 23. Steam under suitable pressure and from a suitable source, such as a boiler not shown, is injected into the kettle 21 through a valve controlled inlet pipe 24 and condensed moisture will be collected in a suitable sump 25 and be drained out through a valve controlled drain pipe 26.

The casing may be removed from the steam kettle as soon as the adhesion or bonding strip 17 has been subject to the required degree of heat for the required time. Providing now that the precured tread band 15 was preformed with the desired tread design, such as the ribs 16, the casing will be ready for service, immediately upon being removed from the steam kettle or at the completion of whatever curing process may be resorted to. However, it should be understood that it is considered within the scope of the present invention to cure up and apply the tread band 15 in a plain form without design-forming recesses and to cut these into the tread band after the tread band has been applied and bonded to the casing.

Of course, it should be appreciated that the adhesion layer will be subject, during curing, not only to the pressure of the steam in the kettle and which may be assumed to be 35 to 45 pounds per square inch, but that said adhesion layer will also be subject to the additional pressure exerted by the stretched elastic precured endless band 15. It should further be understood that the precured tread band will retain its characteristic tendency to return to the short radius and circumference to which it was cured, even after being subject to curing temperature during the final curing process.

To make clear the intended meaning of the term "rolling radius" or "loaded rolling radius," attention is directed primarily to Fig. 6 wherein a normally inflated and normally loaded tire casing is shown in side elevation on a flat road $x$.

All parts of the peripheral crown portion of the casing out of engagement with the road have an equal radius, herein referred to and indicated in Fig. 6 as the "normal expanded radius" of the casing, whereas that portion of the casing tread in engagement with the flat road has a reduced radius, herein referred to as the "loaded rolling radius" of the tire, and it is approximately to this reduced, loaded rolling radius that the tread band 15 is cured. See also explanatory notes and lines in connection with Figs. 1 to 3, inclusive.

What I claim is:

1. The method of treading tire casings which comprises preforming and curing an endless annular band of elastic tread material which, when subsequently stretched, will be subject to its own elastic tension to return to the circumference and radius to which it was cured, and in subsequently applying and adhering this precured endless annular band of tread material to the peripheral crown portion of a tire casing whose said peripheral crown portion has a normal radius and circumference greater than the normal internal radius and circumference of the applied precured endless annular band of tread material.

2. The method of treading tire casings which comprises preforming and precuring an endless annular band of elastic tread material which, when subsequently stretched, will be subject to its own elastic tension to return to the circumference and radius to which it was cured, and in subsequently applying this precured endless annular band of tread material, with an interposed annular layer of adhesion material requiring curing, to the peripheral crown portion of a tire casing whose said peripheral crown portion has a normal radius and circumference greater than the normal internal radius and circumference of the applied precured endless annular band of tread material, and in subsequently curing the interposed layer of adhesion material to provide a firm bond between the previously cured endless annular band of tread material and the previously cured peripheral crown portion of the tire casing.

3. The method of treating tire casings which comprises preforming and precuring an endless annular band of elastic tread material which, when subsequently stretched, will be subject to its own elastic tension to reutrn to the circumference and radius to which it was cured, and in subsequently applying this precured endless annular band of tread material, with an interposed annular layer of adhesion material requiring curing, to the peripheral crown portion of a tire casing whose said peripheral crown portion has a normal radius and circumference greater than the normal internal radius and circumference of the applied precured endless annular band of tread material, and in subsequently heating the interposed layer of adhesion material to cure the same and thereby provide a firm bond between the previously cured annular band of tread material and the previously cured peripheral crown portion of the tire casing.

4. The method of treading tire casings which comprises preforming and precuring an endless annular band of elastic tread material which, when subsequently stretched, will be subject to its own elastic tension to return to the circumference and radius to which it was cured, and in subsequently applying this precured endless annular band of tread material, with an interposed annular layer of adhesion material requiring curing, to the peripheral crown portion of a tire casing whose said peripheral crown portion has a normal radius and circumference greater than the normal internal radius and circumference of the applied precured endless annular band of tread material, and in subsequently subjecting the treaded casing to curing temperature for a time sufficient to cure the interposed layer of adhesion material.

5. The method of treading tire casings which comprises preforming and precuring an endless annular band of elastic tread material which, when subsequently stretched, will be subject to its own elastic tension to return to the circumference and radius to which it was cured, and in subsequently applying this precured endless annular band of tread material, with an interposed annular layer of adhesion material requiring curing, to the peripheral crown portion of a tire casing whose said peripheral crown portion has a normal radius and circumference greater than the normal internal radius and circumference of the applied precured endless annular band of tread material, and in subsequently curing the interposed layer of adhesion material by bringing the exterior of the previously cured tread material into direct contact with heated fluid.

6. The method of treading tire casings which comprises preforming and precuring an endless annular band of elastic tread material which, when subsequently stretched, will be subject to its own elastic tension to return to the circumference and radius to which it was cured, and in subsequently applying this precured endless annular band of tread material, with an interposed annular layer of adhesion material requiring curing, to the peripheral crown portion of a tire casing whose said peripheral crown portion has a normal radius and circumference greater than the normal internal radius and circumference of the applied precured endless annular band of tread material, and in subsequently curing the interposed layer of adhesion material by bringing the exterior of the treaded casing into direct contact with heated fluid under pressure.

7. The method of treading tire casings, which comprises preforming and precuring an endless annular band of elastic tread material which, when subsequently stretched, will be subject to its own elastic tension to return to the circumference and radius to which it was cured, in applying to the inner annular surface of this precured endless annular band of tread material and endless annular layer of adhesion material requiring curing, in applying the said precured endless annular band of tread material and its applied layer of adhesion material to the peripheral crown portion of a precured tire casing whose said peripheral crown portion has a normal radius and circumference greater than the normal internal radius and circumference of the precured endless annular band of tread material, and in curing the interposed layer of adhesion material to provide a firm bond between the previously cured endless annular band of tread material and the previously cured peripheral crown portion of the tire casing.

8. The method of treading tire casings, which comprises preforming and precuring an endless annular band of elastic tread material which, when subsequently stretched, will be subject to its own elastic tension to return to the circumference and radius to which it was cured, in applying to the inner annular surface of this precured endless annular band of tread material an endless annular layer of adhesion material requiring curing, in applying the said precured endless annular band of tread material and its applied layer of adhesion material to the peripheral crown portion of a precured tire casing whose said peripheral crown portion has a normal radius and circumference greater than the normal internal radius and circumference of the precured endless annular band of tread material, and in subsequently applying heat to cure the interposed annular layer of adhesion material while the newly applied previously cured annular band of tread material is circumferentially and radially stretched and exerts its elastic energy against the adhesion layer and the peripheral crown portion of the casing.

9. The method of treading tire casings, which comprises preforming and precuring an endless annular band of elastic tread material which, when subsequently stretched, will be subject to its own elastic tension to return to the circumference and radius to which it was cured, in applying to the inner annular surface of this precured endless annular band of tread material an endless annular layer of adhesion material requiring curing, in applying the said precured endless annular band of tread material and its applied layer of adhesion material to the peripheral crown portion of a precured tire casing whose said peripheral crown portion has a normal radius and circumference greater than the normal internal radius and circumference of the precured endless annular band of tread material, and in curing the interposed layer of adhesion material while maintaining the peripheral crown portion of the previously cured casing subject to expanding pressure causing the precured annular band of tread material to be stretched and maintained under tension to contract against the layer of adhesion material.

10. The method of treading a previously cured tire casing which comprises preforming and precuring an endless annular band of elastic tread material which, when subsequently stretched, will be subject to its own elastic tension to return to the radius and circumference to which it was cured, in laterally spreading the beads of a precured tire casing, whose peripheral crown portion has a radius and circumference greater than the internal radius and circumference of the precured endless annular tread band, to reduce the radius and circumference of the peripheral crown portion of the casing to less than the internal radius and circumference of the said precured endless annular tread band, in applying the previously cured annular band of tread material over the thusly contracted peripheral crown portion of the previously cured tire casing with an annular layer of adhesion material requiring curing interposed therebetween and the precured annular band of tread material, in increasing the circumference and radius of the said peripheral crown portion of the casing to stretch the newly applied tread material and thereby maintain the adhesion material under compression therebetween and peripheral crown of the original casing, and in curing the adhesion material while subject to the said compression caused by the contracting force of the stretched elastic band of precured tread material.

ALLISON DONHAM OWEN.